United States Patent
Ooi et al.

(10) Patent No.: US 6,854,045 B2
(45) Date of Patent: Feb. 8, 2005

(54) HARDWARE EMULATION OF PARALLEL ATA DRIVES WITH SERIAL ATA INTERFACE

(75) Inventors: Eng Hun Ooi, Georgetown (MY); Thien Ern Ooi, Bayan Baru (MY); Chai Huat Gan, Bukit Mertajam (MY)

(73) Assignee: Intel Corporation, Santa Clara, CA (US)

( * ) Notice: Subject to any disclaimer, the term of this patent is extended or adjusted under 35 U.S.C. 154(b) by 571 days.

(21) Appl. No.: 09/895,691

(22) Filed: Jun. 29, 2001

(65) Prior Publication Data

US 2003/0005231 A1 Jan. 2, 2003

(51) Int. Cl.7 ............................................. G06F 12/10
(52) U.S. Cl. ......................... 711/202; 710/71; 711/111
(58) Field of Search ........................ 711/111, 112, 202; 710/62, 65, 71, 72, 74

(56) References Cited

U.S. PATENT DOCUMENTS

| | | | | |
|---|---|---|---|---|
| 5,561,826 A | * | 10/1996 | Davies et al. | 710/71 |
| 5,604,870 A | * | 2/1997 | Moss et al. | 710/100 |
| 5,758,127 A | * | 5/1998 | MacAulay et al. | 710/71 |
| 6,684,275 B1 | * | 1/2004 | Goldstein | 710/71 |

OTHER PUBLICATIONS

Serial ATA Enabling the Future, 2000, Serial ATA Working Group, www.serialata.org/faqs.html.

Serial ATA, Nov. 7, 2000, Maxtor Corporation, http://www.maxtor.com/quantum/src/whitepapers/wp‾serialata.htm.

* cited by examiner

Primary Examiner—Gary Portka
(74) Attorney, Agent, or Firm—Blakely, Sokoloff, Taylor & Zafman LLP (57) ABSTRACT

An access detector detects an access type of an access to one of a plurality of serial ports interfacing to serial storage devices. The access is intended to one of a plurality of parallel channels interfacing to parallel storage devices via task file registers of the parallel channels. A mapping circuit maps the serial ports to the parallel channels. A state machine emulates a response from the one of the parallel channels based on the access type and the mapped serial ports.

48 Claims, 11 Drawing Sheets

HARDWARE EMULATION OF PARALLEL ATA DRIVES WITH SERIAL ATA INTERFACE

BACKGROUND

1. Field of the Invention

This invention relates to storage interface. In particular, the invention relates to interface to Advanced Technology Attachment (ATA) drives.

2. Description of Related Art

The parallel ATA interface has existed in substantially the same form since 1989, and has become the highest volume disk drive interface in production. However, as demand for higher transfer and storage bandwidths increases, the parallel ATA is nearing its performance limit. Serial ATA interface is introduced to replace parallel ATA. The benefits of serial ATA include high data transfer rates up to 150 MB/s (compared to 100 MB/s for parallel ATA), low cost, easy installation and configuration, low pin count, etc. However, due the large amount of parallel ATA currently in existence, the transition from parallel ATA to serial ATA may be a problem.

Parallel ATA allows up to two devices to be connected to a single port using a master/slave communication technique. One ATA device is configured as a master and the other slave. Both devices are daisy-chained together via one ribbon cable that is an unterminated multidrop bus. This bus or connection is typically referred to as a parallel channel. In addition, a personal computer (PC) may have two parallel ATA channels: a primary channel and a secondary channel.

Serial ATA, on the other hand, connects each of the two drives with individual cables in a point-to-point fashion. Software drivers for parallel ATA have to be modified to accommodate serial ATA. In addition, new serial ATA interface is preferably backward compatible with parallel ATA device drivers to avoid transition costs and provide an easy migration path.

Therefore, there is a need to have an efficient technique to emulate parallel ATA interface in a serial ATA environment.

BRIEF DESCRIPTION OF THE DRAWINGS

The features and advantages of the present invention will become apparent from the following detailed description of the present invention in which.

DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
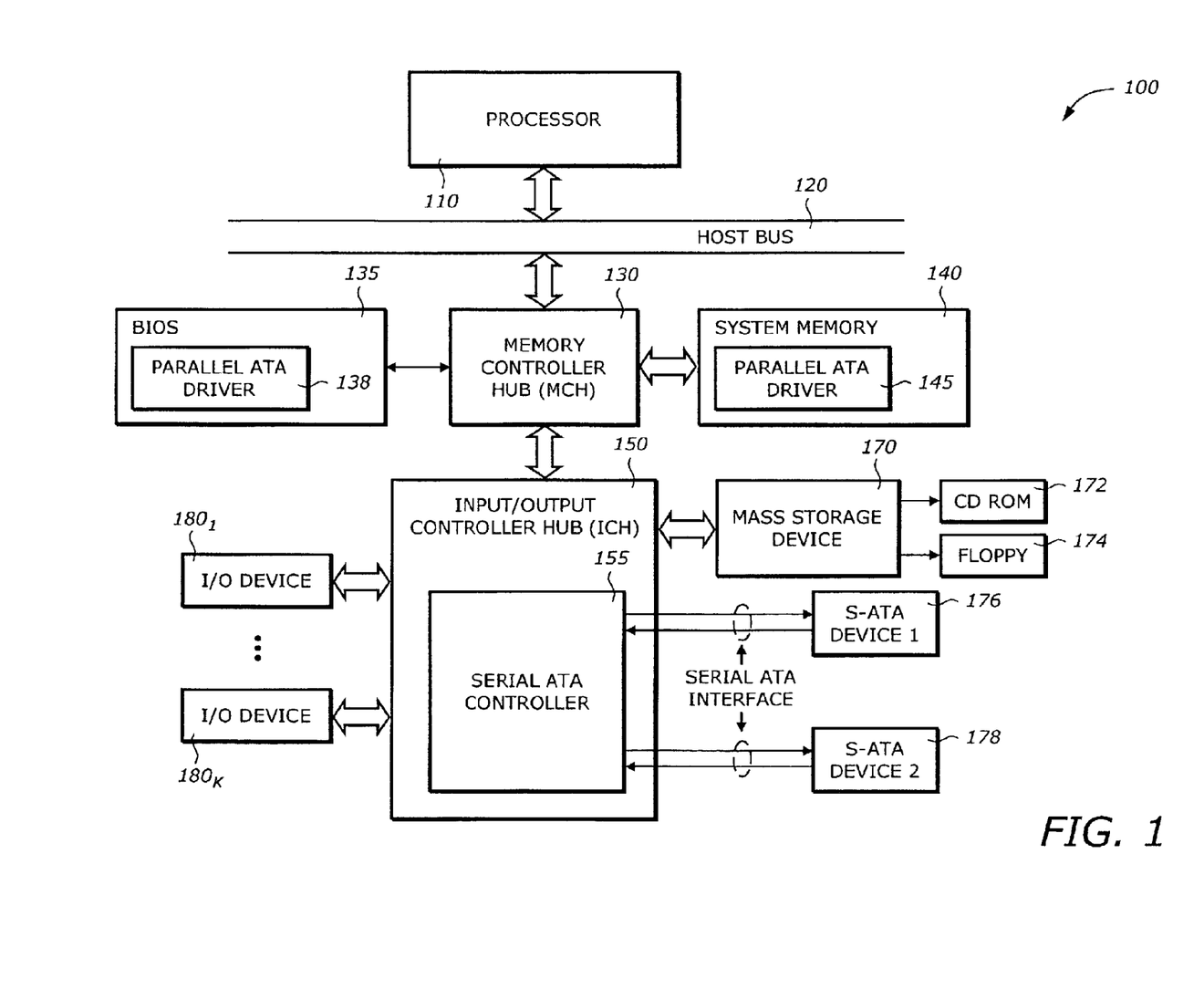
FIG. 1 is a diagram illustrating a system in which one embodiment of the invention can be practiced.

FIG. 1 is a diagram illustrating a computer system 100 in which one embodiment of the invention can be practiced. The computer system 100 includes a processor 110, a host bus 120, a memory control hub (MCH) 130, a Basic Input/Output System memory 135, a system memory 140, an input/output control hub (ICH) 150, serial ATA devices 176 and 178, a mass storage device 170, and input/output devices $180_1$ to $180_K$.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The processor 110 typical contains a number of control registers to support memory management tasks such as virtual memory and cache memory. These tasks may include paging and segmentation.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The BIOS memory 135 stores boot-up code and data. The BIOS memory 135 typically is implemented with non-volatile memory such as Read Only Memory (ROM), flash memory, and other similar memories. The BIOS memory 135 may also be stored inside the MCH 130. The BIOS memory 135 may contain a parallel ATA driver 138 to control the serial ATA devices 176 and 178 via the ICH 150.

The system memory 140 stores system code and data. The system memory 140 is typically implemented with dynamic random access memory (DRAM) or static random access memory (SRAM). The system memory may include program code or code segments implementing one embodiment of the invention. The system memory may also include a parallel ATA driver 145. The parallel ATA driver 145 may be part of an Operating System (OS) or an application program. The parallel ATA driver 145 accesses the serial ATA devices 176 and 178 via the ICH 150. The parallel ATA driver 138 in the BIOS memory 135 and the parallel ATA driver 145 in the memory 140 may or may not co-exist.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc. In particular, the ICH 150 includes an ATA controller 155 to control serial ATA devices 176 and 178. The ATA controller 155 has hardware emulator for backward compatibility with the parallel ATA device drivers. The ATA controller 155 provides a migration path for customers to take advantage of the serial ATA interface while using the existing parallel ATA drivers.

The serial ATA devices 176 and 178 are mass storage devices or hard disk to store archive information such as code, programs, files, data, application, operating systems, etc. The serial ATA devices 176 and 178 are connected to the hard drive controller 155 via serial ATA interface signals. The serial ATA interface, protocols, and standards follow the proposed draft entitled "Serial ATA/High Speed Serialized AT Attachment" by the Serial ATA Workgroup, Revision 1.0.0.1, published Apr. 9, 2001. The mass storage device 170 stores other archive information. The mass storage device 170 may include compact disk (CD) ROM 172, floppy diskettes 174, and hard drive 176, and any other magnetic or optic storage devices. The mass storage device 170 provides a mechanism to read machine-readable media.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium.

The "processor readable medium" may include any medium that can store or transfer information. Examples of the processor readable medium include an electronic circuit, a semiconductor memory device, a ROM, a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

On a parallel ATA interface, after power-on, a hardware or software reset, or after execution of an Executive Device Diagnostic command, the slave device presents the diagnostic status to the master device via a PDIAG-wire in the ATA ribbon cable. Upon observing the status on the PDIAG-signal, the master device updates the status and error registers accordingly. For serial ATA interface, such direct communication between the two serial ATA devices does not exist. In addition, on a parallel ATA interface, both ATA devices on the same channel observe the signal activity on the cable. For example, the write access to the ATA Command Block registers (except the Data and Command registers) is seen and accepted by both devices. On the other hand, in serial ATA interface, each serial ATA device is independent of the other.

Another difference is the interrupt generation. On parallel ATA interface, the interrupt output pin of the ATA device(s) on the primary channel is routed to the Interrupt Request (IRQ) number 14 (IRQ 14) and the interrupt output pin of the ATA device(s) on the secondary channel is routed to the IRQ 15. On the serial ATA interface, a serial ATA device generates an interrupt by sending a Device-to-Host register Frame Information Structure (FIS) or a PIO Setup Frame Information Structure with the I bit set to "1".

In order to mimic the interaction visible to the parallel ATA driver 138, the emulator in the ATA controller 155 forwards and manipulates software accesses to both serial ATA devices 176 and 178 which are mapped as ATA devices on virtual ATA channel. In addition, the emulator also routes the serial ATA devices' interrupt to either IRQ 14 or IRQ 15.

Figure 2:
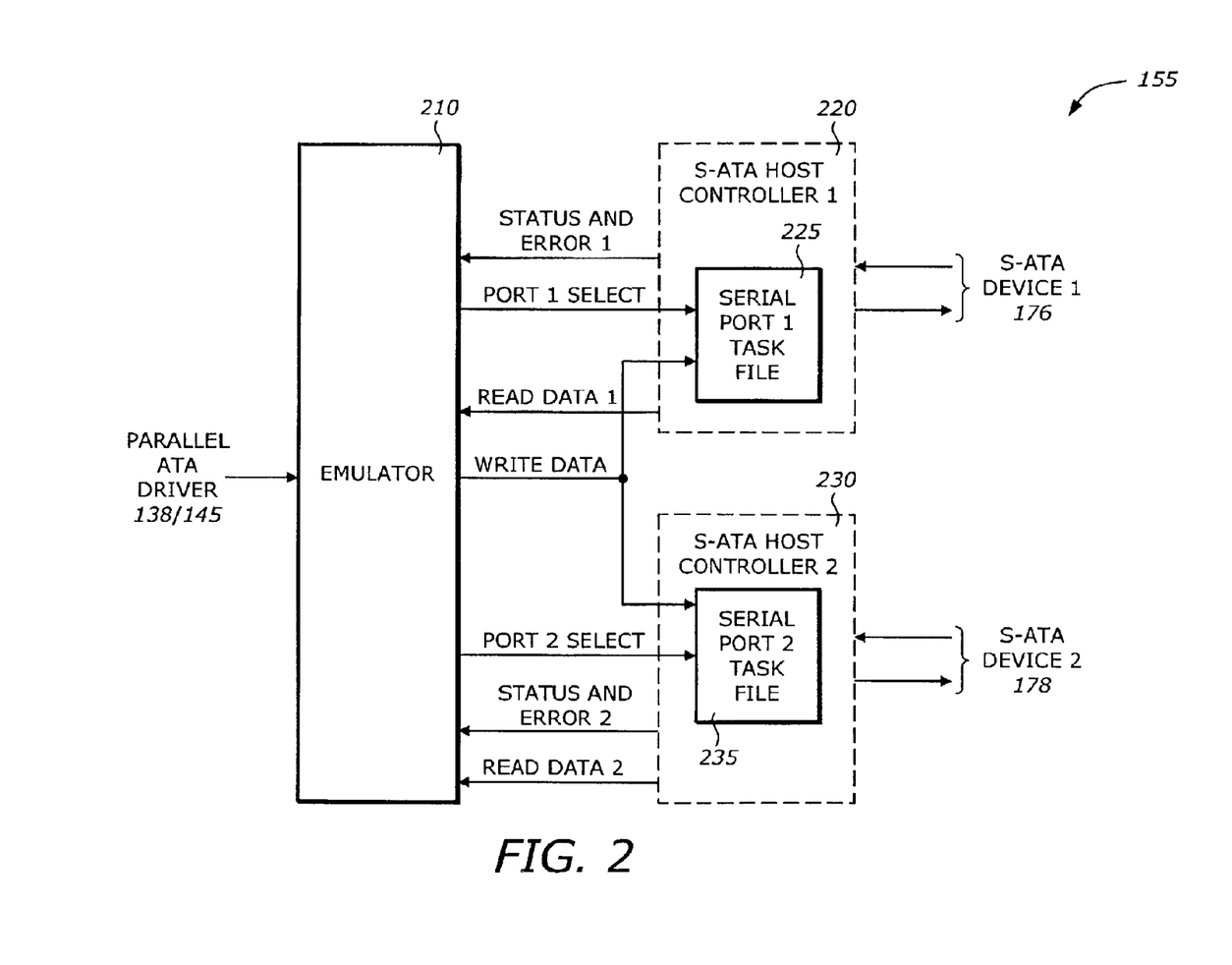
FIG. 2 is a diagram illustrating an ATA controller shown in FIG. 1 according to one embodiment of the invention.

FIG. 2 is a diagram illustrating the ATA controller 155 shown in FIG. 1 according to one embodiment of the invention. The ATA controller 155 includes an emulator 210 and serial ATA host controllers (1 and 2) 220 and 230.

The emulator 210 emulates a response of a parallel ATA device when interacting with the parallel ATA driver 138. The emulator 210 is a hardware circuit that operates transparently to the parallel ATA driver 138 so that the parallel ATA driver 138 can still control the serial ATA devices 176 and 178 as if they were parallel ATA devices. The emulator 210 may be disabled when the ATA driver is written directly for the serial ATA devices 176 and 178.

The serial ATA host controllers 220 and 230 contain registers, control circuits, and interface circuits to the serial ATA devices 176 and 178, respectively. In particular, the serial ATA host controllers 220 and 230 contain the serial port task files 225 and 235, respectively, which contain the operational registers that control and configure the corresponding serial ATA devices 176 and 178. The serial ATA host controller 220 and 230 may be referred to as serial ports.

The emulator 210 selects a serial port as mapped to the parallel channel via the port 1 select or port 2 select signals. The emulator 210 writes data to the selected serial port via the write data signal path and reads data from the selected serial port via the corresponding read data signal paths. The serial ATA host controllers 220 and 230 provide the status and error conditions to the emulator 210.

Figure 3:
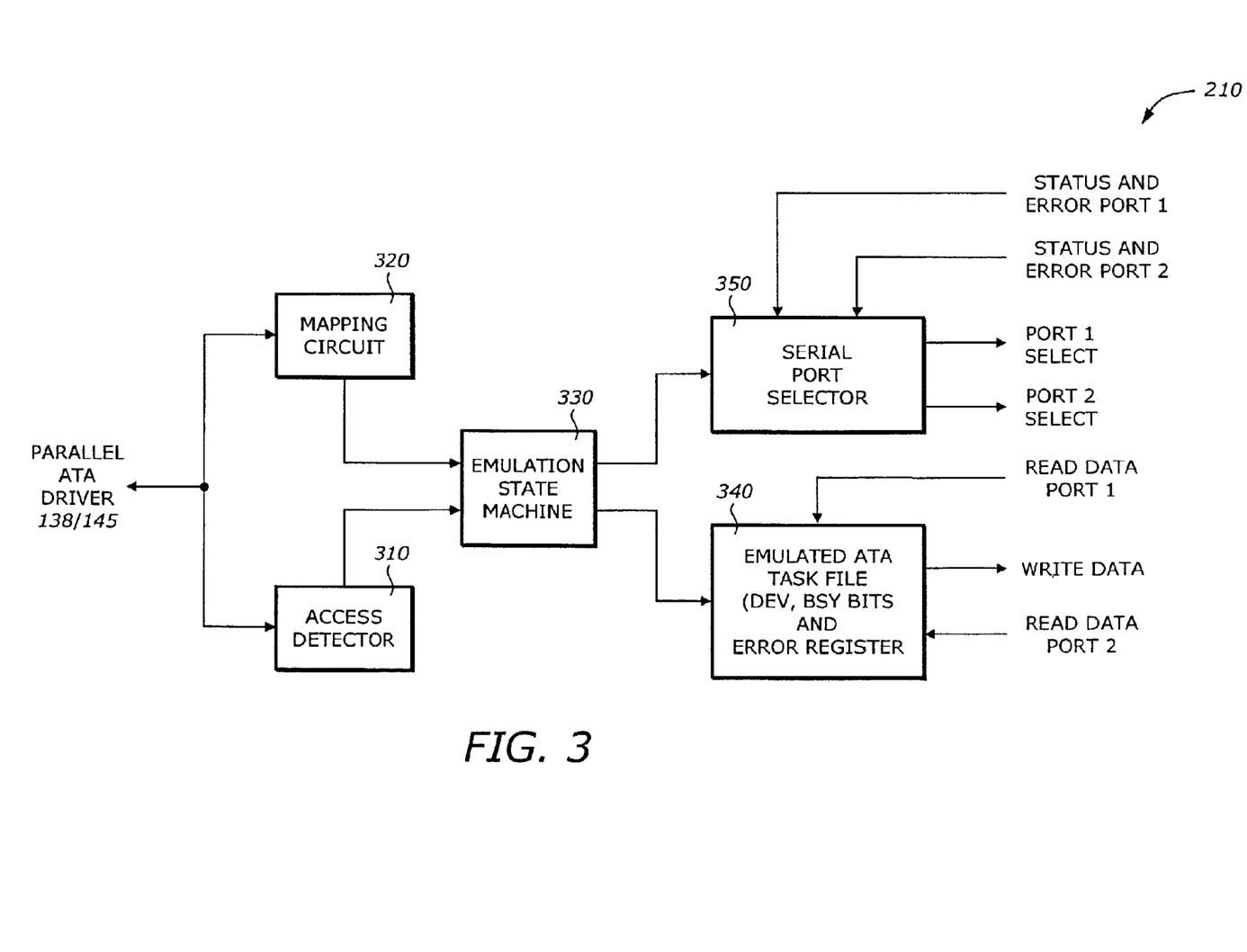
FIG. 3 is a diagram illustrating an emulator in the ATA controller shown in FIG. 2 according to one embodiment of the invention.

FIG. 3 is a diagram illustrating the emulator 210 in the ATA controller shown in FIG. 2 according to one embodiment of the invention. The emulator 210 includes an access detector 310, a mapping circuit 320, an emulation state machine 330, an emulated task file register set 340, and a serial port selector 350.

The access detector 310 detects an access type of an access to one of the serial ports 220 and 230 interfacing to the serial storage devices 176 ad 178. The access is provided by the parallel ATA driver 138 and is intended to one of the parallel channels interfacing to parallel storage devices via the task file registers of the parallel channels.

The mapping circuit 320 maps the serial ports to the parallel channels. The mapping may be done by an address translation. A serial port may be mapped to a master or slave parallel channel according to a device (DEV) bit in the device/head register.

The emulation state machine 330 emulates a response from one of the parallel channels based on the access type as detected by the access detector 310 and the mapped serial ports as provided by the mapping circuit 320. The state machine 330 includes a number of states to perform a sequence of operations according to the access type. As will be explained later, there are five states that correspond to emulation of the response according to five different access types and an interrupt state that corresponds to emulation of interrupt generation.

The emulated task file register set 340 emulates the task file registers of the parallel channels. These registers may include information about the device (DEV), busy (BSY) bits and the error register.

The serial port selector 350 selects one of the serial ports 220 and 230 based on the mapped serial ports provided by the mapping circuit 320. For example, when the parallel ATA driver 138 generates an access to a parallel channel, the mapping circuit 320 translates the address of the parallel channel into a serial port. This mapping information is passed to the serial port selector 350 directly or via the state machine 330 to select the corresponding serial port. The selection may be performed by enabling the selected serial ATA host controller.

Figure 4:
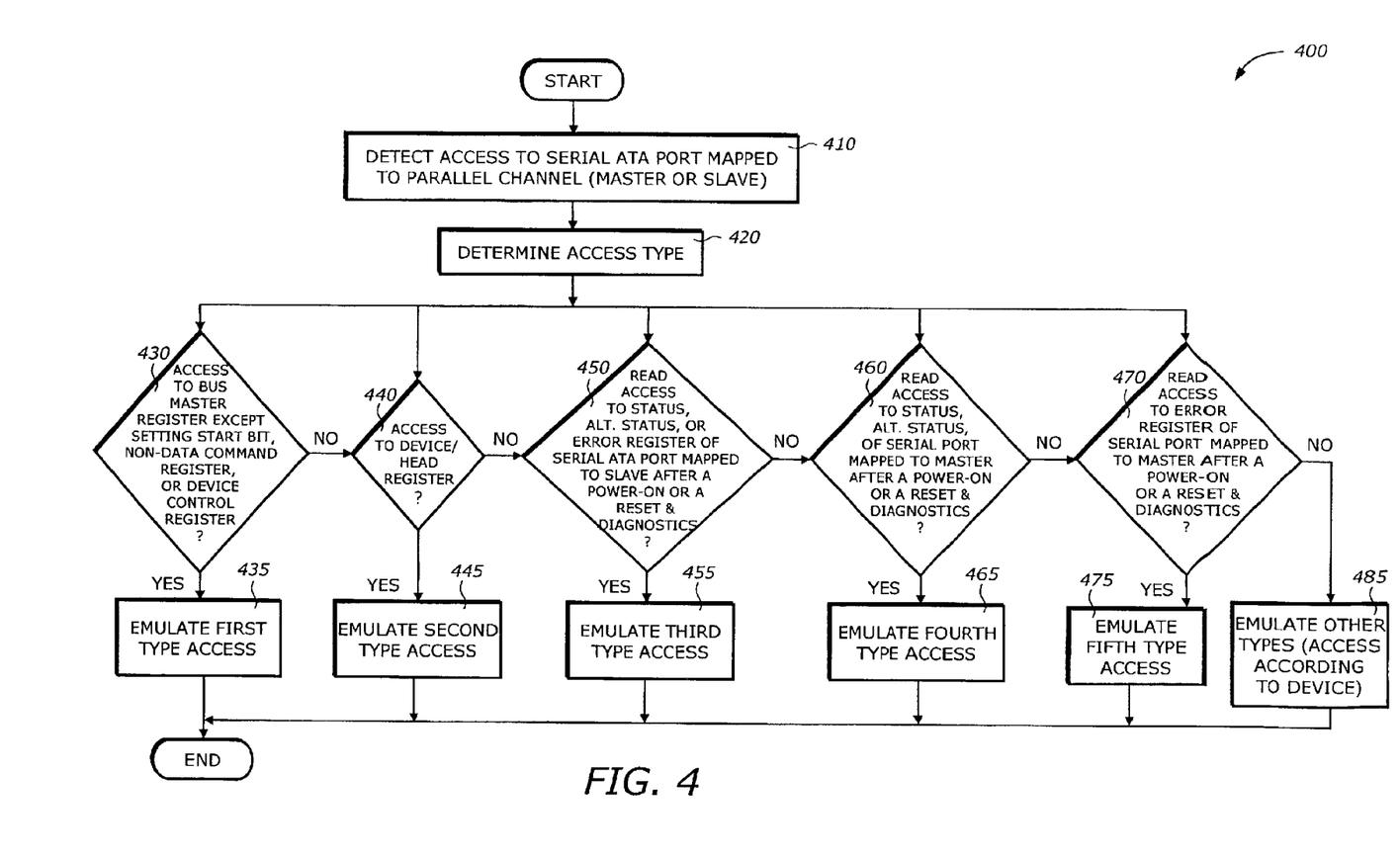
FIG. 4 is a flowchart illustrating a process to emulate a response from a parallel channel based on access type according to one embodiment of the invention.

FIG. 4 is a flowchart illustrating a process 400 to emulate a response from a parallel channel based on access type according to one embodiment of the invention.

Upon START, the process 400 detects an access to the serial ATA port which is mapped to a parallel channel, either as a master or slave channel (Block 410). The access is made by the parallel ATA driver. Then, the process 400 determines the type of access (Block 420). This can be done by decoding the access information such as addresses and read/write information.

The process 400 determines if the access is to a bus master register except setting the START bit of Bus Master Command Register to '1', a non-data command register, or a device control register (Block 430). If so, the process 400 emulates a first type access (Block 435) and is then terminated. The first type access emulation is explained in FIG. 5. Otherwise, the process 400 determines if the access is to a device/head register (Block 440). If so, the process 400 emulates a second type access (Block 445) and is then terminated. The second type access emulation is explained in FIG. 6. Otherwise, the process 400 determines if the access is a read access to a status register, an alternate register, or an error register of a selected serial port mapped to a slave parallel channel after a power-on, hardware or software reset, or an execution of the device diagnostics command (Block 450). If so, the process 400 emulates the third type access (Block 455) and is then terminated. The third type access emulation is explained in FIG. 7. Otherwise, the process 400 determines if the access is a read access to a status register or an alternate register of a serial port mapped to a master parallel channel after a power-on, hardware or software reset, or an execution of the device diagnostics command (Block 460). If so, the process 400 emulates the fourth type access (Block 465) and is then terminated. The fourth type emulation is explained in FIG. 8. Otherwise, the process 400 determines if the access is a read access to an error register of a serial port mapped to a master parallel channel after a power-on, hardware or software reset, or an execution of the device diagnostics command (Block 470). If so, the process 400 emulates the fifth type access (Block 475) and is then terminated. Otherwise, the process 400 emulates other types (Block 485) and is then terminated.

Figure 5:
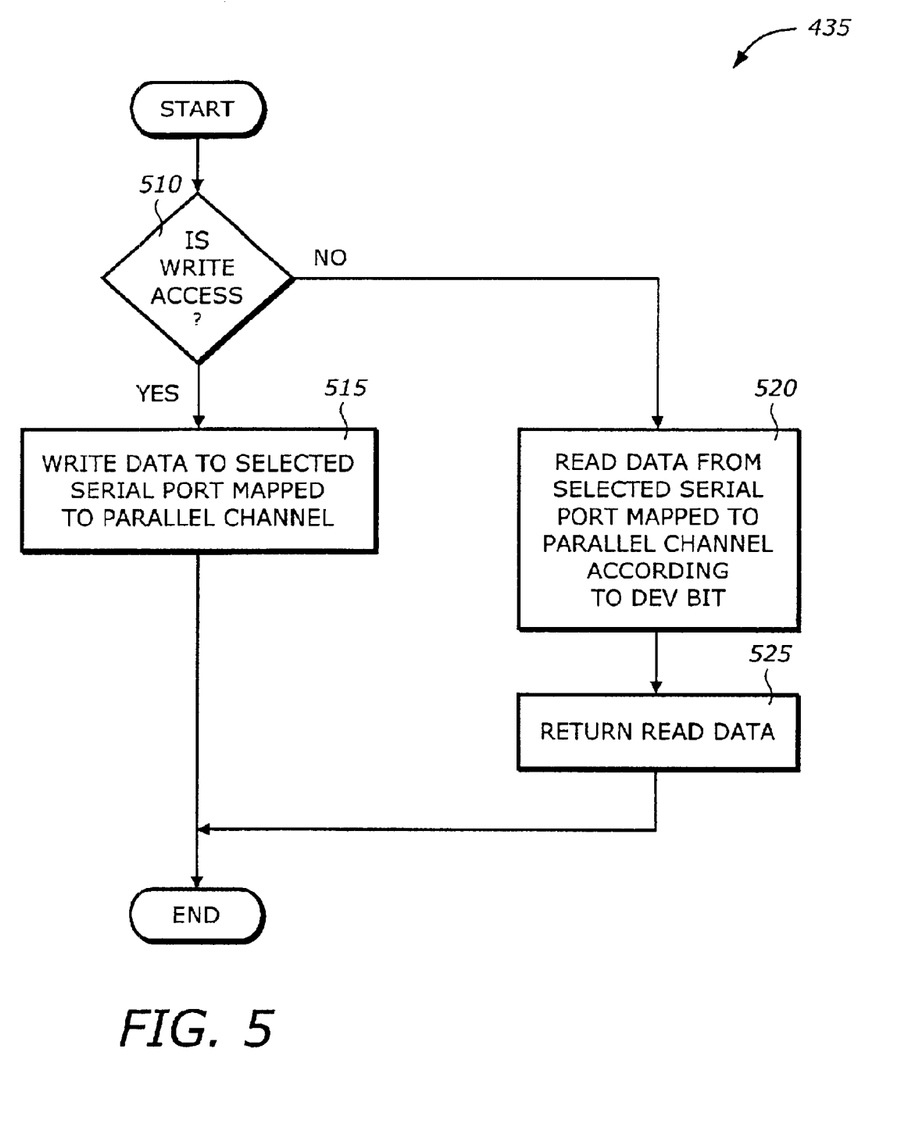
FIG. 5 is a flowchart illustrating a process to emulate a response when the access type is the first access type according to one embodiment of the invention.

FIG. 5 is a flowchart illustrating the process 435 to emulate a response when the access type is the first access type according to one embodiment of the invention. The process 435 is performed by the first state in the state machine 330 shown in FIG. 3.

Upon START, the process 435 determines if the access is a write access (Block 510). If so, the process 435 writes the data to the selected serial port that is mapped to the parallel channel (Block 515) and is then terminated. Otherwise, the access is a read access and the process 435 reads the data from the selected serial port that is mapped to the parallel channel according to the device (DEV) bit (Block 520). Then, the process 435 returns the read data to the access requester and is then terminated.

Figure 6:
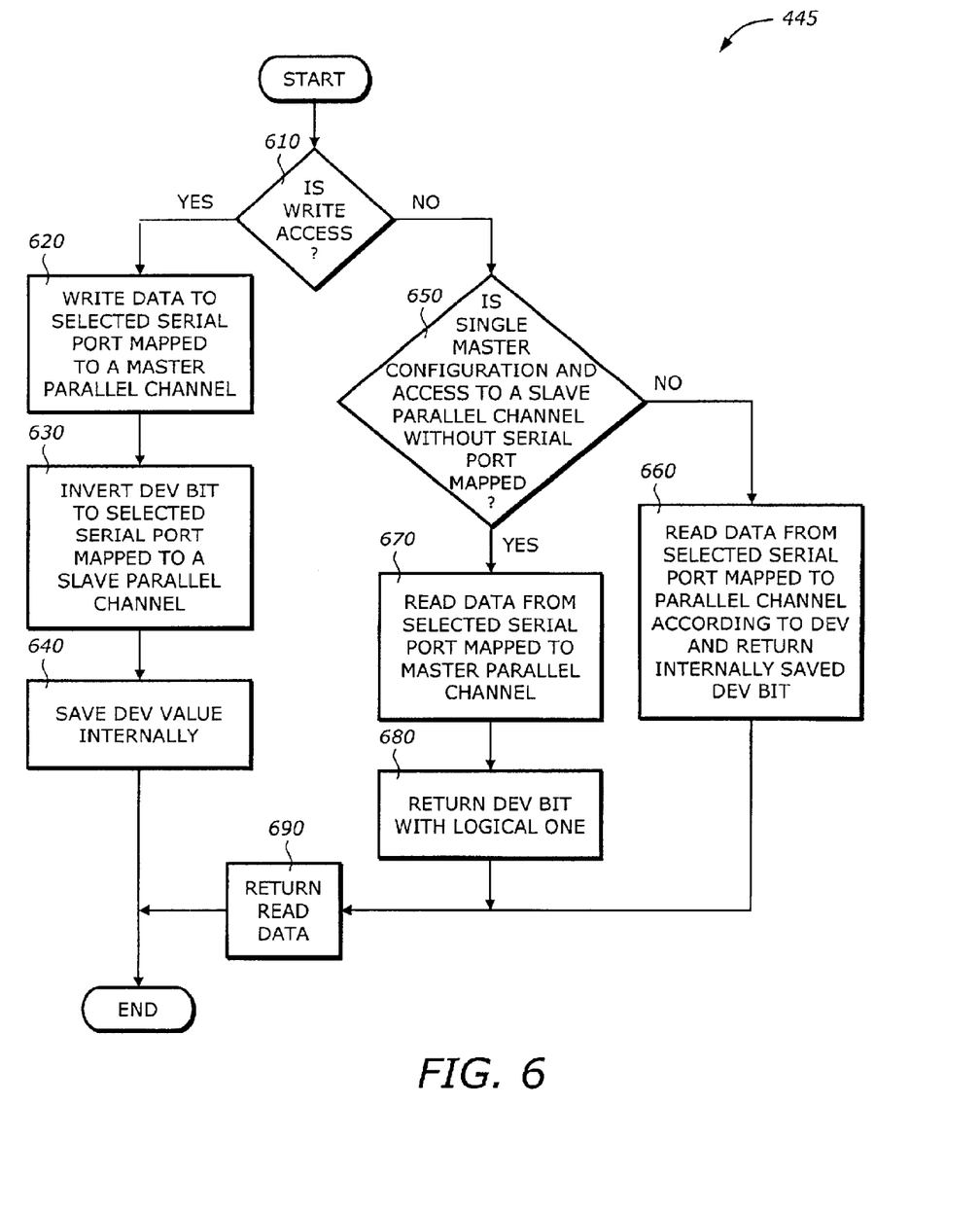
FIG. 6 is a flowchart illustrating a process to emulate a response when the access type is the second access type according to one embodiment of the invention.

FIG. 6 is a flowchart illustrating the process 445 to emulate a response when the access type is the second access type according to one embodiment of the invention. The process 445 is performed by the second state in the state machine 330 shown in FIG. 3.

Upon START, the process 445 determines if the access is a write access (Block 610). If so, the process 445 writes the data to the selected serial port which is mapped to a master parallel channel (Block 620). Then, the process 445 inverts the device (DEV) bit to the serial port mapped to a slave parallel channel (Block 630). Next, the process 445 saves the DEV value internally (Block 640) and is then terminated.

If the access is a read access, the process 445 determines if the access is a special case which accesses to a slave parallel channel without a serial port mapped to it in a single master configuration (Block 650). If so, the process 445 reads the data from the selected serial port mapped to a master parallel channel (Block 670). Then, the process 445 returns the DEV bit with a logical one (Block 680). Next, the process 445 returns the read data (Block 690) and is then terminated.

If the access is not a special case, the process 445 reads the data from the serial port mapped to the parallel channel according to the DEV bit and returns the internally saved DEV bit (Block 660). Then, the process 445 returns the read data (Block 690) and is then terminated.

Figure 7:
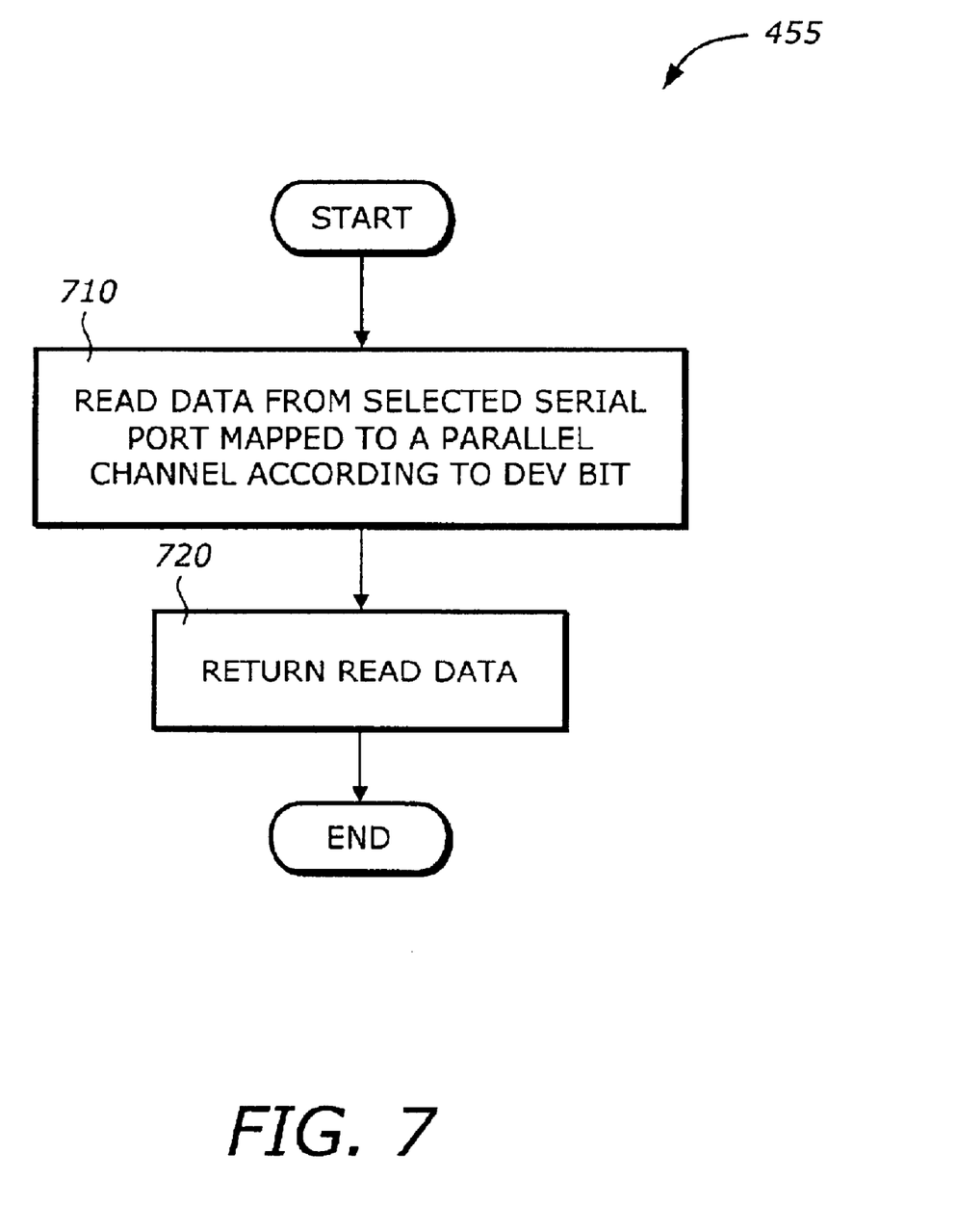
FIG. 7 is a flowchart illustrating a process to emulate a response when the access type is the third access type according to one embodiment of the invention.

FIG. 7 is a flowchart illustrating the process 455 to emulate a response when the access type is the third access type according to one embodiment of the invention. The process 455 is performed by the third state in the state machine 330 shown in FIG. 3.

Upon START, the process 455 reads the data from the selected serial port mapped to a parallel channel according to the DEV bit (Block 710). Then, the process 455 returns the read data (Block 720) and is then terminated.

Figure 8:
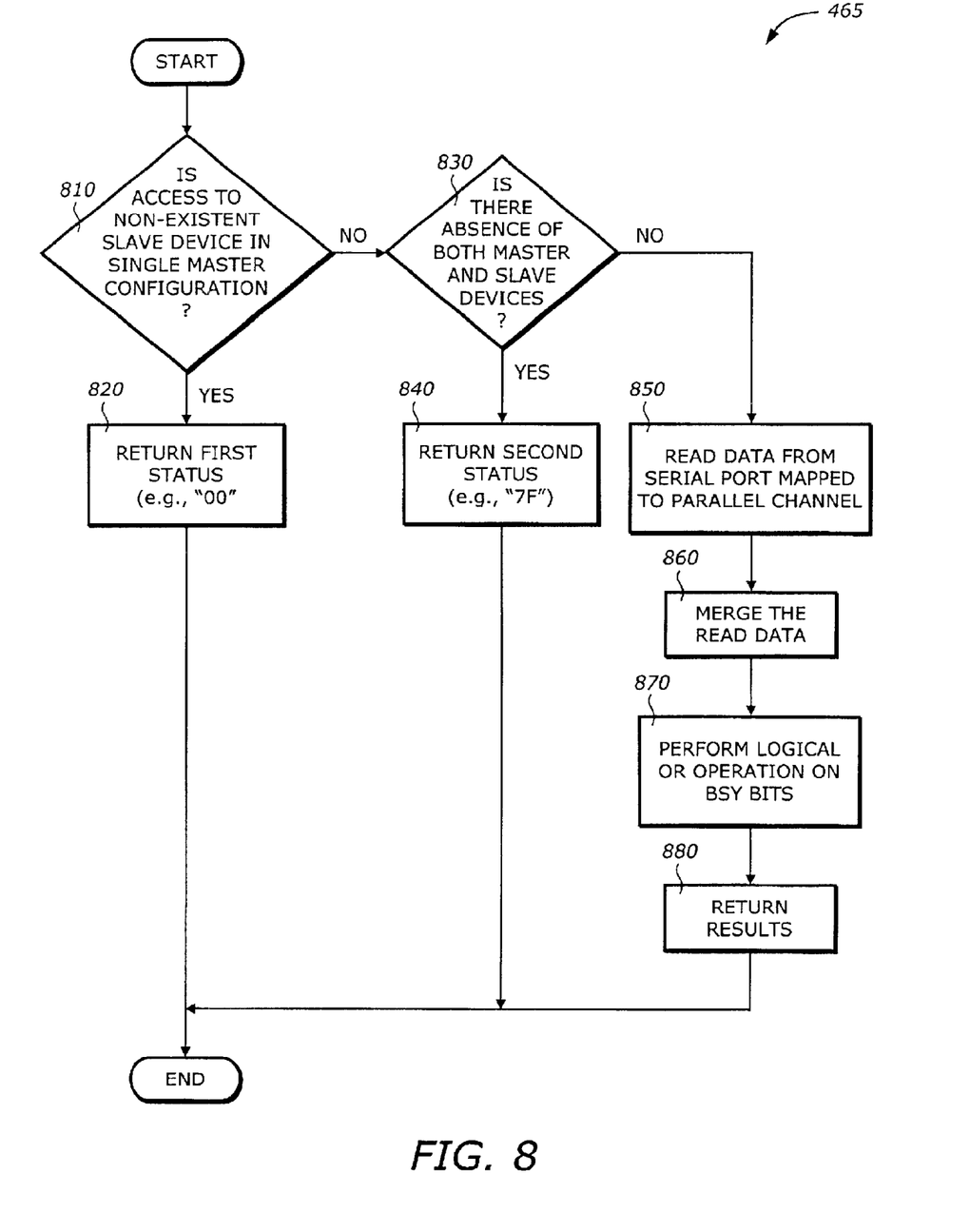
FIG. 8 is a flowchart illustrating a process to emulate a response when the access type is the fourth access type according to one embodiment of the invention.

FIG. 8 is a flowchart illustrating the process 465 to emulate a response when the access type is the fourth access type according to one embodiment of the invention. The process 465 is performed by the fourth state in the state machine 330 shown in FIG. 3.

Upon START, the process 465 determines if the access is to a non-existent slave device in a single master configuration (Block 810). If so, the process 465 returns the first status (e.g., "00") (Block 820) and is then terminated. Otherwise, the process 465 determines if there is absence of both master and slave devices and thus the access is to a non-existent device (Block 830). If so, the process 465 returns the second status (e.g., "7F" in hexadecimal) (Block 840) and is then terminated. Otherwise, the process 465 reads the data from the serial port mapped to the parallel channel (Block 850). Then, the process 465 merges the read data (Block 860). Next, the process 465 performs a logical OR operation on the busy (BSY) bits of the read data (Block 870). Then, the process 465 returns the result of the OR operation and the read data (Block 880) and is then terminated.

Figure 9:
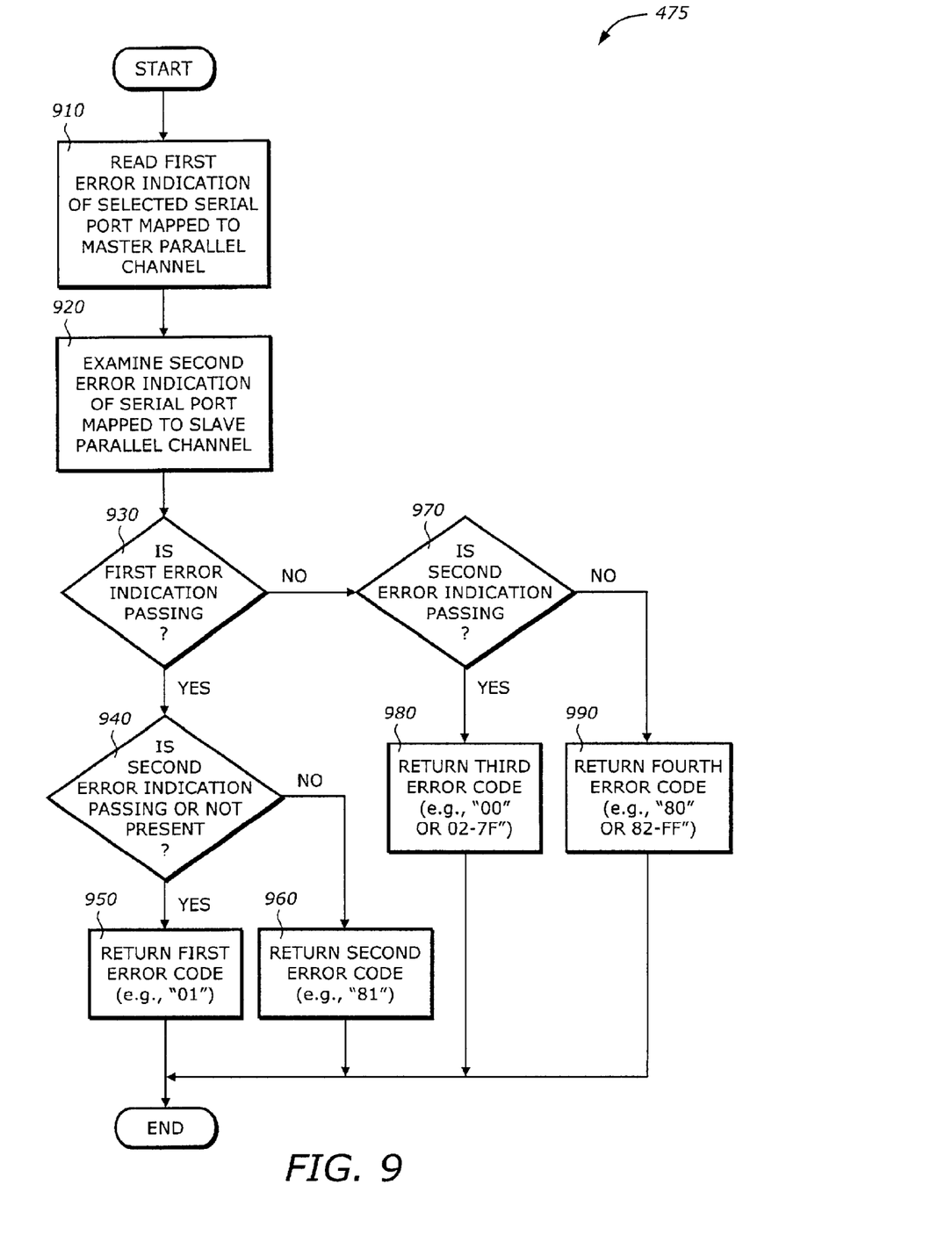
FIG. 9 is a flowchart illustrating a process to emulate a response when the access type is the fifth access type according to one embodiment of the invention.

FIG. 9 is a flowchart illustrating the process 475 to emulate a response when the access type is the fifth access type according to one embodiment of the invention. The process 475 is performed by the fifth state in the state machine 330 shown in FIG. 3.

Upon START, the process 475 reads the first error indication from the selected serial port mapped to a master parallel channel (Block 910). Next, the process 475 examines the second error indication of the serial port mapped to a slave parallel channel (Block 920). Then, the process 475 determines if the first error indication indicates a passing status (Block 930). If not, the process 475 goes to Block 970. If so, the process 475 determines if the second error indication indicates a passing or a device-not-present status (Block 940). If so, the process 475 returns a first error code (e.g., "01") (Block 950) and is then terminated. Otherwise, the process 475 returns a second error code (e.g., "81" in hexadecimal) (Block 460) and is then terminated.

At block 970, the process 475 determines if the second error indication indicates a passing status. If so, the process 475 returns a third error code (e.g., "00" or "02" to "7F" in hexadecimal) (Block 980) and is then terminated. Otherwise, the process 475 returns a fourth error code (e.g., "80" or "82" to "FF" in hexadecimal) and is then terminated.

Figure 10:
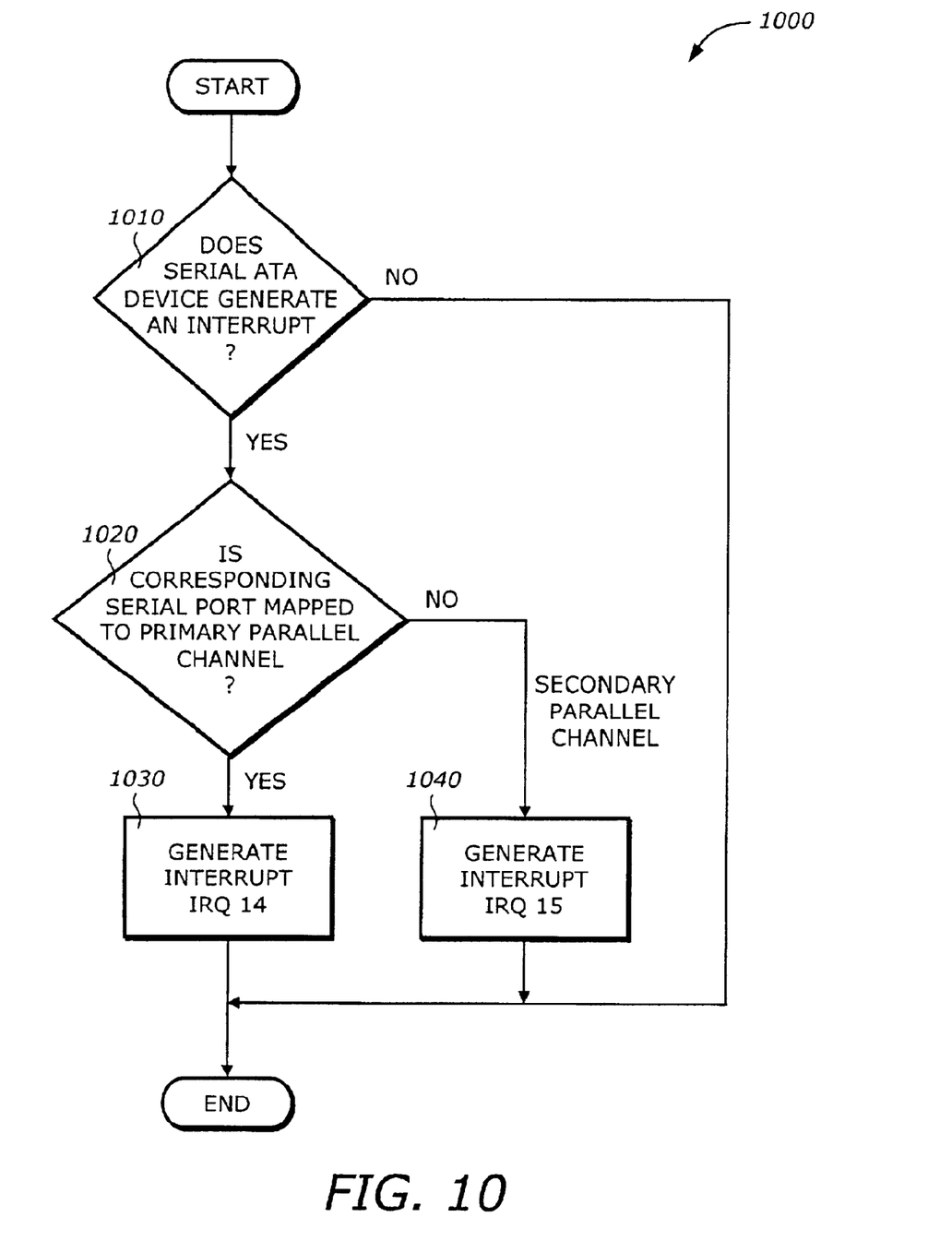
FIG. 10 is a flowchart illustrating a process to emulate an interrupt according to one embodiment of the invention.

FIG. 10 is a flowchart illustrating a process 1000 to emulate an interrupt according to one embodiment of the invention. The process 1000 is perform by an interrupt state of the state machine 330 shown in FIG. 3.

Upon START, the process 1000 determines if the serial ATA device generate an interrupt (Block 1010). This is indicated by the setting of the I bit in the Device-to-Host register FIS or PIO Setup FIS. If not, the process 1000 is terminated. Otherwise, the process 1000 determines if the serial port is mapped to a primary parallel channel (Block 1020). If so, the process 1000 generates an interrupt corresponding to the interrupt request (IRQ) 14 (Block 1030). Otherwise, the serial port is mapped to a secondary parallel channel and the process 1000 generates an interrupt corresponding to the IRQ 15 (Block 1040) and is then terminated.

Figure 11:
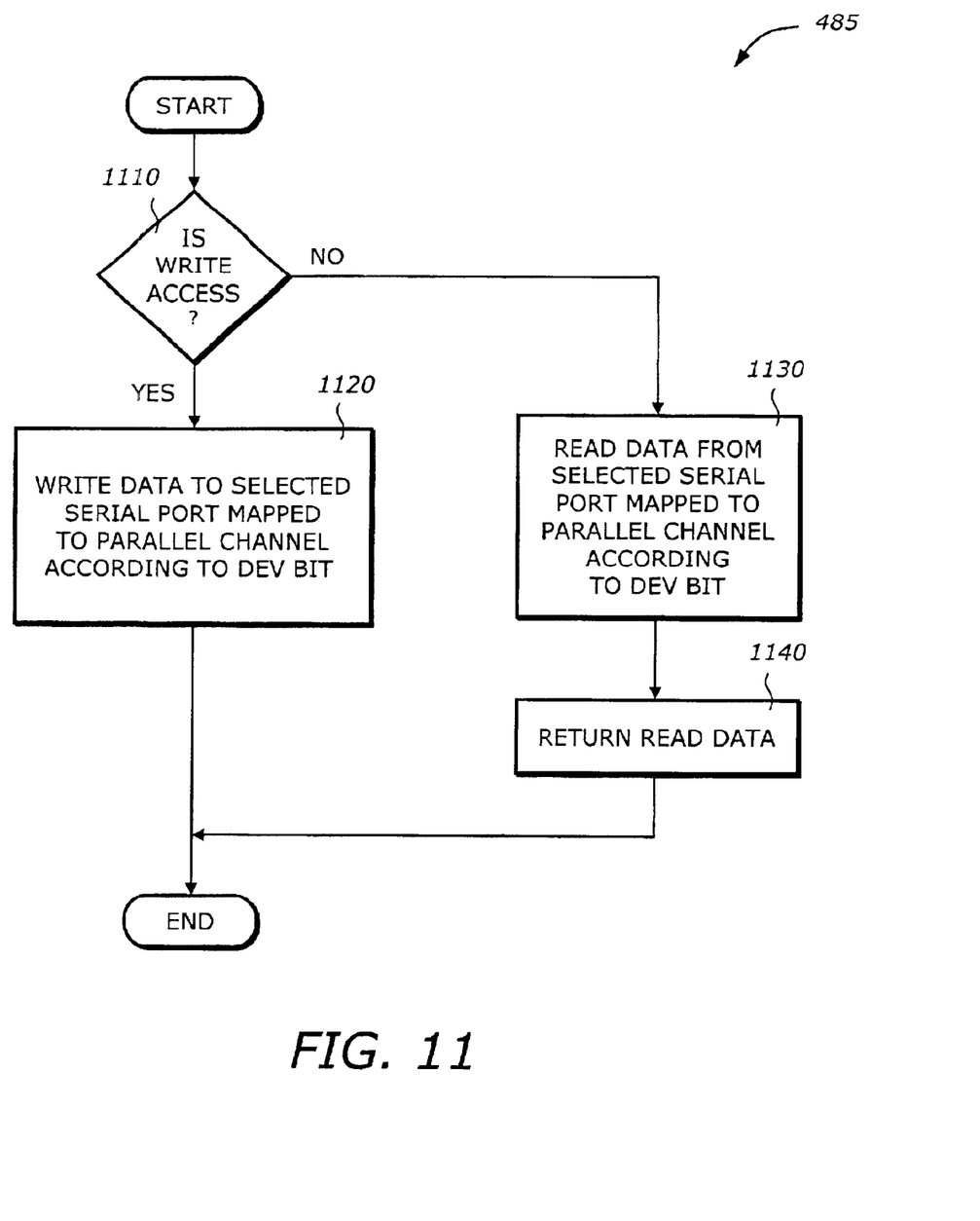
FIG. 11 is a flowchart illustrating a process to emulate other types according to one embodiment of the invention.

FIG. 11 is a flowchart illustrating the process 485 to emulate other types according to one embodiment of the invention.

Upon START, the process 485 determines if the access is a write access (Block 1110). If so, the process 485 writes the data to the selected serial port that is mapped to the parallel channel according to the device (DEV) bit (Block 1120) and is then terminated. Otherwise, the access is a read access and the process 485 reads the data from the selected serial port that is mapped to the parallel channel according to the device (DEV) bit (Block 1130). Then, the process 485 returns the read data to the access requester (Block 1140) and is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention. For example, although the above description refers to serial and parallel ATA interfaces, the technique can be applied to any point-to-point interface.

What is claimed is:

1. An apparatus comprising:
an access detector to detect an access type of an access to one of a plurality of serial ports interfacing to serial storage devices, the access being provided by a parallel driver to one of a plurality of parallel channels interfacing to parallel storage devices via task file registers of the parallel channels;
a mapping circuit to map the serial ports to the parallel channels;
a state machine coupled to the access detector and the mapping circuit to emulate a response from the one of the parallel channels based on the access type and the mapped serial ports;
a plurality of registers coupled to the state machine and the access detector to emulate the task file registers of the parallel channels; and
a serial port selector coupled to the state machine and the serial ports to select the one of the serial ports based on the mapped serial ports.

2. The apparatus of claim 1 wherein the access type is one of first, second, third, fourth, and fifth access types.

3. The apparatus of claim 2 wherein the first access type includes a first read to one of a bus master register, a non-data command register, and a device control register, and a first write to one of a bus master register except setting a START bit of bus master command register to a logical one, a non-data command register, and a device control register.

4. The apparatus of claim 3 wherein the state machine comprises:
a first write state to write data to the selected serial port mapped to the one of the parallel channels when the access type is the first write; and
a first read state to read data from the selected serial port mapped to the one of the parallel channels according to a device bit when the access type is the first read.

5. The apparatus of claim 2 wherein the second access type includes one of a second read from and a second write to a device/head register.

6. The apparatus of claim 5 wherein the state machine comprises:
   a second write state to write data to the selected serial port mapped to a master parallel channel when the access type is the second write, the second write state inverting a device bit to the selected serial port mapped to a slave parallel channel when the access type is the second write;
   a device state to save internally the device bit when the access type is the second write; and
   a second read state to read data from the selected serial port mapped to the one of the parallel channel and to return the internally saved device bit when the access type is the second read in a master-slave configuration, the second read state reading from the selected serial port mapped to a master parallel channel and returning the device bit with a logical one when the access type is the second read to a slave parallel channel in a single master configuration.

7. The apparatus of claim 2 wherein the third access type includes a third read to one of a status register, an alternate status register, and an error register of the selected serial port mapped to a slave parallel channel after a power-on or a reset and execution of a device diagnostics command.

8. The apparatus of claim 7 wherein the state machine comprises:
   a third read state to read data from the selected serial port mapped to the one of the parallel channels according to a device bit when the access type is the third read.

9. The apparatus of claim 2 wherein the fourth access type includes a fourth read to one of a status register and an alternate status register of the selected serial port mapped to a master parallel channel after a power-on or a reset and execution of an Execute Device Diagnostics command.

10. The apparatus of claim 9 wherein the state machine comprises:
    a fourth read state to read data from the selected serial ports mapped to the one of the parallel channels and merge the read data when the access type is the fourth read.

11. The apparatus of claim 10 wherein the fourth read state performs a logical OR operation on the busy (BSY) bits from the read data.

12. The apparatus of claim 10 wherein the fourth read state provides one of first and second codes according to device existence.

13. The apparatus of claim 2 wherein the fifth access type includes a fifth read to an error register of the selected serial port mapped to a master parallel channel after a power-on or a reset and execution of an Execute Device Diagnostics command.

14. The apparatus of claim 13 wherein the state machine comprises:
    a fifth read state to read a first error indication from the selected serial port mapped to the master parallel channel and to examine a second error indication of a serial port mapped to a slave parallel channel when the access type is the fifth read, the fifth read state returning an error code according to the first and second error indications of the serial ports mapped to the master and slave parallel channels.

15. The apparatus of claim 14 wherein the fifth read state saves an error indication of the serial port mapped to the slave parallel channel when a device bit is changed to a logical one, the first error indication and the saved error indication being returned as the error code for the serial port mapped to the master parallel channel.

16. The apparatus of claim 2 wherein the state machine comprises:
    an interrupt state to generate first and second interrupt signals according to an interrupt bit provided by one of the serial storage devices when the selected serial port is mapped to master and slave parallel channels, respectively.

17. A method comprising:
    detecting an access type of an access to one of a plurality of serial ports interfacing to serial storage devices, the access being provided by a parallel driver to one of a plurality of parallel channels interfacing to parallel storage devices via task file registers of the parallel channels;
    mapping the serial ports to the parallel channels;
    emulating a response from the one of the parallel channels based on the access type and the mapped serial ports by a state machine;
    emulating the task file registers of the parallel channels; and
    selecting the one of the serial ports based on the mapped serial ports.

18. The method of claim 17 wherein the access type is one of first, second, third, fourth, and fifth access types.

19. The method of claim 18 wherein the first access type includes a first read to one of a bus master register, a non-data command register, and a device control register, and a first write to one of a bus master register except setting a START bit of bus master command register to a logical one, a non-data command register, and a device control register.

20. The method of claim 19 wherein emulating the response comprises:
    writing data to the selected serial port mapped to the one of the parallel channels when the access type is the first write; and
    reading data from the selected serial port mapped to the one of the parallel channels according to a device bit when the access type is the first read.

21. The method of claim 18 wherein the second access type includes one of a second read from and a second write to a device/head register.

22. The method of claim 21 wherein emulating the response comprises:
    writing data to the selected serial port mapped to a master parallel channel when the access type is the second write;
    inverting a device bit to the selected serial port mapped to a slave parallel channel when the access type is the second write;
    saving internally the device bit when the access type is the second write; and
    reading data from the selected serial port mapped to the one of the parallel channel;
    returning the internally saved device bit when the access type is the second read in a master-slave configuration; and
    reading from the selected serial port mapped to a master parallel channel and returning the device bit with a logical one when the access type is the second read to a slave parallel channel in a single master configuration.

23. The method of claim 18 wherein the third access type includes a third read to one of a status register, an alternate status register, and an error register of the selected serial port mapped to a slave parallel channel after a power-on or a reset and execution of an Execute Device Diagnostics command.

24. The method of claim 23 wherein emulating the response comprises:
reading data from the selected serial port mapped to the one of the parallel channels according to a device bit when the access type is the third read.

25. The method of claim 18 wherein the fourth access type includes a fourth read to one of a status register and an alternate status register of the selected serial port mapped to a master parallel channel after a power-on or a reset and execution of an Execute Device Diagnostics command.

26. The method of claim 25 wherein emulating the response comprises:
reading data from the selected serial ports mapped to the one of the parallel channels and merging the read data when the access type is the fourth read.

27. The method of claim 26 wherein reading data when the access type is the fourth read comprises performing a logical OR operation on the busy (BSY) bits from the read data.

28. The method of claim 26 wherein reading data when the access type is the fourth read comprises providing one of first and second codes according to device existence.

29. The method of claim 18 wherein the fifth access type includes a fifth read to an error register of the selected serial port mapped to a master parallel channel after a power-on or a reset and execution of an Execute Device Diagnostics command.

30. The method of claim 29 wherein emulating the response comprises:
reading a first error indication from the selected serial port mapped to the master parallel channel when the access type is the fifth read;
examining a second error indication of a serial port mapped to a slave parallel channel when the access type is the fifth read;
returning an error code according to the first and second error indications of the serial ports mapped to the master and slave parallel channels.

31. The method of claim 30 wherein emulating the response further comprises:
saving an error indication of the serial port mapped to the slave parallel channel when a device bit is changed to a logical one and the access type is the fifth read; and
returning the error code according to the first and the saved error indications to the serial port mapped to the master parallel channel when the access type is the fifth read.

32. The method of claim 17 wherein emulating the response comprises:
generating first and second interrupt signals according to an interrupt bit provided by one of the serial storage devices when the selected serial port is mapped to master and slave parallel channels, respectively.

33. A system comprising:
a plurality of serial storage devices; and
a chipset coupled to the serial storage devices, the chipset having a serial storage controller, the serial storage controller comprising:
an access detector to detect an access type of an access to one of a plurality of serial ports interfacing to the serial storage devices, the access being provided by a parallel driver to one of a plurality of parallel channels interfacing to parallel storage devices via task file registers of the parallel channels,
a mapping circuit to map the serial ports to the parallel channels,
a state machine coupled to the access detector and the mapping circuit to emulate a response from the one of the parallel channels based on the access type and the mapped serial ports;
a plurality of registers coupled to the state machine and the access detector to emulate the task file registers of the parallel channels; and
a serial port selector coupled to the state machine and the serial ports to select the one of the serial ports based on the mapped serial ports.

34. The system of claim 33 wherein the access type is one of first, second, third, fourth, and fifth access types.

35. The system of claim 34 wherein the first access type includes a first read to one of a bus master register, a non-data command register, and a device control register, and a first write to one of a bus master register except setting a START bit of bus master command register to a logical one, a non-data command register, and a device control register.

36. The system of claim 35 wherein the state machine comprises:
a first write state to write data to the selected serial port mapped to the one of the parallel channels when the access type is the first write; and
a first read state to read data from the selected serial port mapped to the one of the parallel channels according to a device bit when the access type is the first read.

37. The system of claim 34 wherein the second access type includes one of a second read from and a second write to a device/head register.

38. The system of claim 37 wherein the state machine comprises:
a second write state to write data to the selected serial port mapped to a master parallel channel when the access type is the second write, the second write state inverting a device bit to the selected serial port mapped to a slave parallel channel when the access type is the second write;
a device state to save internally the device bit when the access type is the second write; and
a second read state to read data from the selected serial port mapped to the one of the parallel channel and to return the internally saved device bit when the access type is the second read in a master-slave configuration, the second read state reading from the selected serial port mapped to a master parallel channel and returning the device bit with a logical one when the access type is the second read to a slave parallel channel in a single master configuration.

39. The system of claim 34 wherein the third access type includes a third read to one of a status register, an alternate status register, and an error register of the selected serial port mapped to a slave parallel channel after a power-on or a reset and execution of an Execute Device Diagnostics command.

40. The system of claim 39 wherein the state machine comprises:
a third read state to read data from the selected serial port mapped to the one of the parallel channels according to a device bit when the access type is the third read.

41. The system of claim 34 wherein the fourth access type includes a fourth read to one of a status register and an alternate status register of the selected serial port mapped to a master parallel channel after a power-on or a reset and execution of an Execute Device Diagnostics command.

42. The system of claim 41 wherein the state machine comprises:

a fourth read state to read data from the selected serial ports mapped to the one of the parallel channels and merge the read data when the access type is the fourth read.

43. The system of claim 42 wherein the fourth read state performs a logical OR operation on the busy (BSY) bits from the read data.

44. The system of claim 42 wherein the fourth read state provides one of first and second codes according to device existence.

45. The system of claim 34 wherein the fifth access type includes a fifth read to an error register of the selected serial port mapped to a master parallel channel after a power-on or a reset and execution of an Execute Device Diagnostics command.

46. The system of claim 45 wherein the state machine comprises:

a fifth read state to read a first error indication from the selected serial port mapped to the master parallel channel and to examine a second error indication of a serial port mapped to a slave parallel channel when the access type is the fifth read, the fifth read state returning an error code according to the first and second error indications of the serial ports mapped to the master and slave parallel channels.

47. The system of claim 46 wherein the fifth read state saves an error indication of the serial port mapped to the slave parallel channel when a device bit is changed to a logical one, the first error indication and the saved error indication being returned as the error code for the serial port mapped to the master parallel channel.

48. The system of claim 33 wherein the state machine comprises:

an interrupt state to generate first and second interrupt signals according to an interrupt bit provided by one of the serial storage devices when the selected serial port is mapped to master and slave parallel channels, respectively.

\* \* \* \* \*